April 26, 1927.
A. C. YOUNGSON
SYSTEM FOR PREPARING PACKAGES FOR SHIPMENT OR DELIVERY
Filed July 14, 1926
3 Sheets-Sheet 1
1,626,492
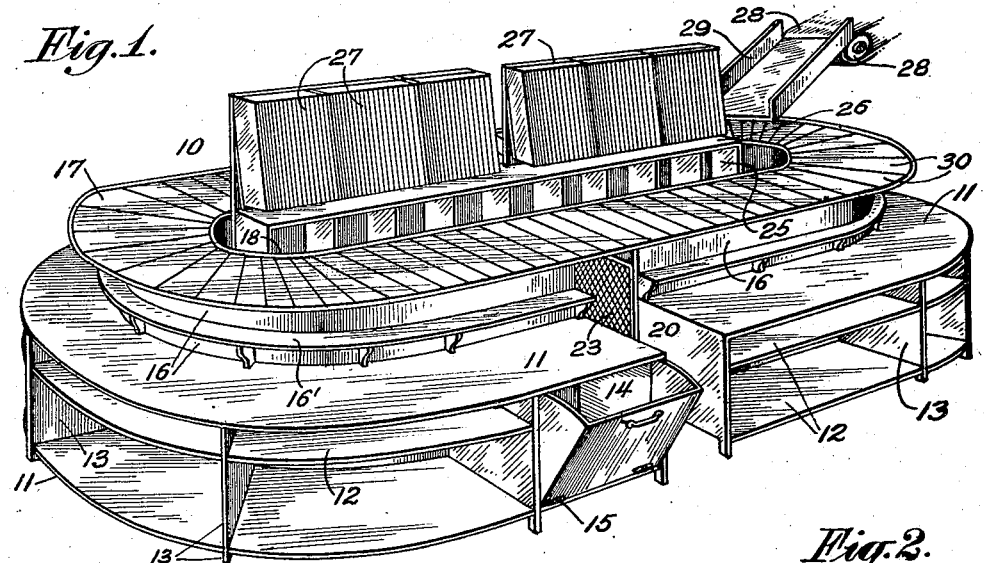
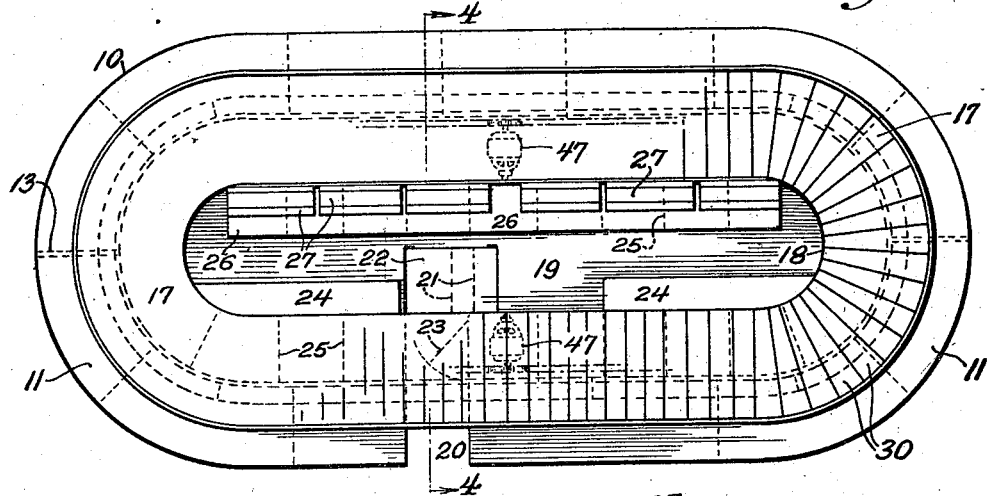
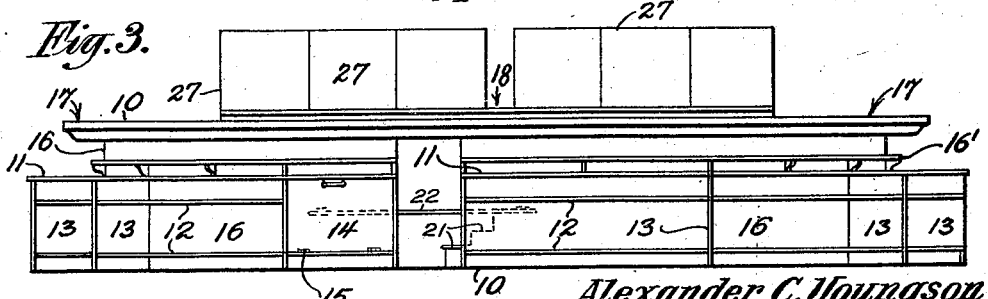
Alexander C. Youngson
INVENTOR

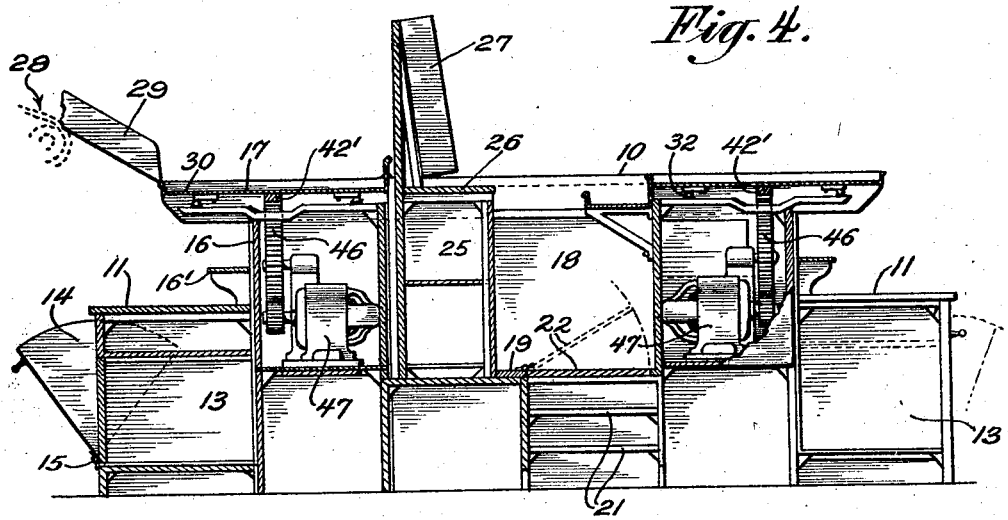
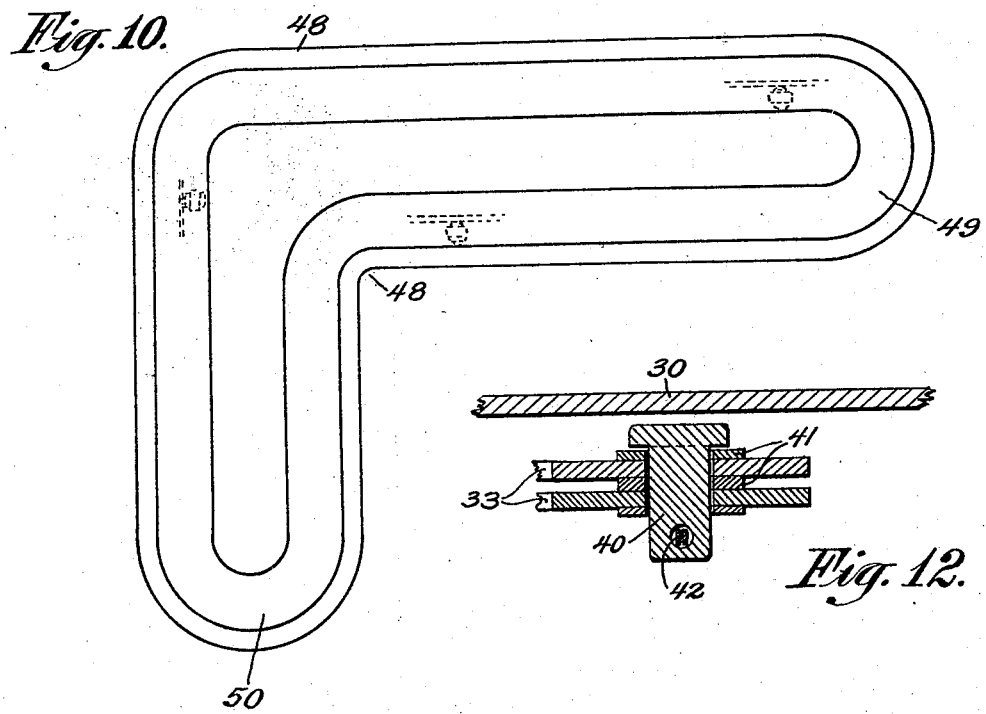

April 26, 1927.  
A. C. YOUNGSON  
1,626,492  
SYSTEM FOR PREPARING PACKAGES FOR SHIPMENT OR DELIVERY  
Filed July 14, 1926  
3 Sheets-Sheet 3
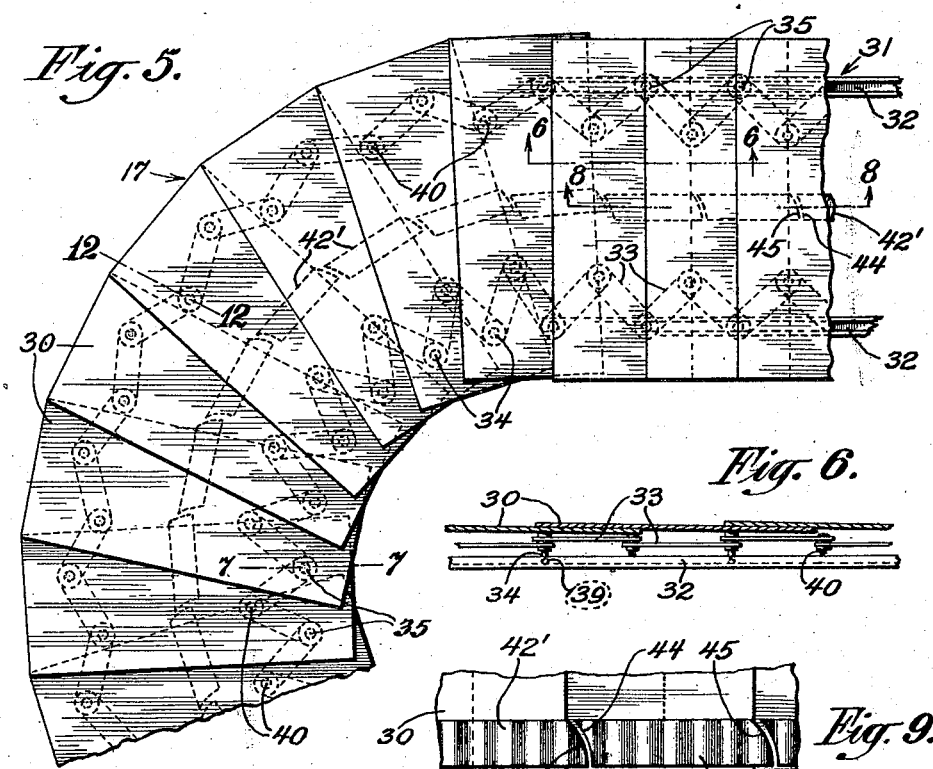
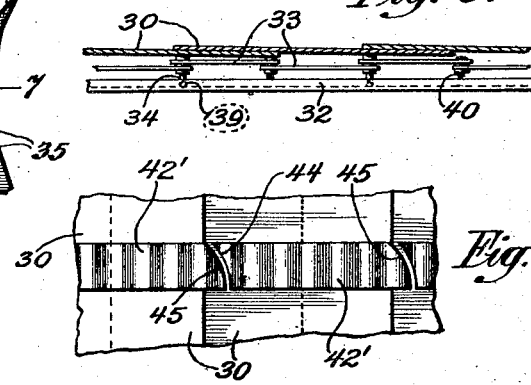
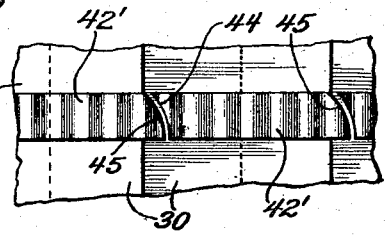
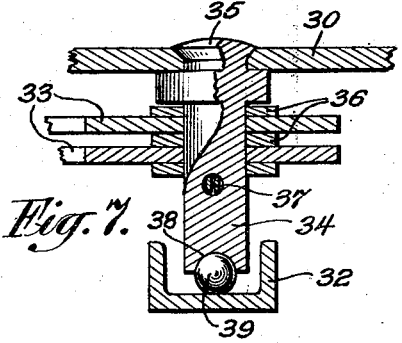
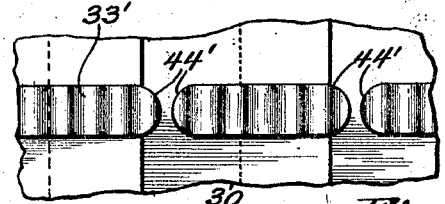
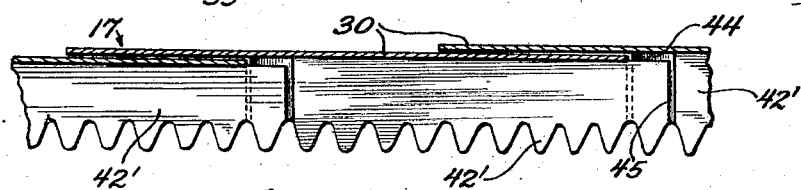
Alexander C. Youngson  
INVENTOR  
BY Victor J. Evans  
ATTORNEY Patented Apr. 26, 1927.

1,626,492

UNITED STATES PATENT OFFICE.

ALEXANDER C. YOUNGSON, OF BROOKLYN, NEW YORK.

SYSTEM FOR PREPARING PACKAGES FOR SHIPMENT OR DELIVERY.

Application filed July 14, 1926. Serial No. 122,449.

This invention relates to improvements in systems for preparing packages for shipments or delivery and has particular reference to a wrapping, routing and authorization unit for use in large department stores.

The primary object of the invention is to systemize the routine commonly used in department stores in preparing purchased articles for shipment by centralizing the various duties of certain of the clerks, whereby to expedite shipment and to handle a larger amount of shipments in less time and in a smaller amount of space than is now required.

Another object of the invention resides in a unit for systemizing the duties of the authorization clerks, the routing clerks and the wrapping clerks, and to which unit, additional units may be added to accommodate a larger volume of business as the same increases.

A further object of the invention resides in a unit of the class described, in which is arranged an endless conveyor constructed of a plurality of plates, movable over a continuous elongated track and means for compensating for the varied differences in speed of the ends of the plates when passing about a curve in the track to maintain a continuous uninterrupted conveyor surface.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved unit.

Figure 2 is a top plan view of the same.

Figure 3 is a front elevation of the unit.

Figure 4 is a vertical transverse sectional view on the line 4—4 of Figure 2.

Figure 5 is an enlarged detail plan view of a plurality of conveyor plates operatively connected together.

Figure 6 is a sectional view on the line 6—6 of Figure 5.

Figure 7 is a similar view on the line 7—7 of Figure 5.

Figure 8 is a similar view on the line 8—8 of Figure 5.

Figure 9 is a bottom plan view of a plurality of plates.

Figure 10 is a diagrammatic view of a modified form of unit.

Figure 11 is a detail bottom plan view of several of the conveyor plates used in connection with the modified form of my invention.

Figure 12 is an enlarged detail vertical sectional view on the line 12—12 of Figure 5.

Referring more particularly to the drawings, the reference numeral 10 designates my improved unit in its entirety, which includes an elongated structure having wrapping tables 11 extending therearound at which the wrapping clerks stand in the performance of their duties presently to be described. Shelves 12 are provided beneath the tables 11 and are divided into compartments by partitions 13 which serve as supporting legs for the structure. The shelves 12 may be used for the storage of packing boxes and wrapping paper for use by the wrapping clerks in preparing the packages for delivery and are so positioned as to be within easy reach. Bins 14 are also provided beneath the tables 11 at suitable spaced intervals and are hingedly mounted as at 15 to be capable of movement beyond the front of the table for easy access thereto. The bins are adapted to contain excelsior or other similar material used for packing fragile articles.

A wall structure 16 extends above the inner edges of the table 11 for the support of a continuous conveyor 17 which will be more clearly described hereinafter. Supported by the exterior of the wall structure 16 are shelves 16', which are disposed above the tables 11 for the accommodation of labels, paste, twine and the like.

The conveyor 17 defines a paddock 18 which is provided with a raised platform or floor 19, access to which is had by a passage 20 through the tables 11 and beneath the conveyor 17. Steps 21 lead from the floor proper to the raised platform and which steps are normally covered by a trap door 22. A door 23 is mounted in the passage way 20 to exclude unauthorized persons from the enclosed paddock. Along one of the side walls of the paddock, I provide receiving tables 24 which are disposed on opposite sides of entrance or passage-way 20, and disposed at opposite sides of the paddock are what I term as refer bins 25.

An authorization table 26 is arranged along the other side of the paddock on which the authorization indexes 27 are mounted and which are of the swinging type. The indexes are not part of the unit equipment but have been shown to illustrate their relative position therewith. The center of enclosure or paddock is intended for the routing or authorization clerks in carrying out their duties.

A description of the operation of the system from what has already been described is as follows:—The unit is installed in a suitable location of the store, and purchased packages or articles for delivery are carried by a general collecting conveyor 28 to a chute 29, which is positioned at one end of the unit, and from which chute, the packages are deposited upon the endless conveyor 17, which is travelling in the direction of the arrow shown in Figure 1 of the drawings. The conveyor 17 carries the packages to be wrapped past the wrapping clerks who are standing about the table 11 and who wrap the packages and again place them back upon the conveyor. The routing clerk assumes a position at the center of the paddock between the receiving tables 24, and his duties are to mark the delivery route thereon as they pass the same to another conveyor or chute (not shown). Should a package appear marked "charge", the routing clerk removes the same from the conveyor and places the packages upon the receiving table 24, at his right or left according to their alphabetical order for authorization by the authorization clerk. The authorization clerk refers to his index files 27 to determine whether the credit of the purchaser is good, and if so the packages are so marked and deposited on the conveyor, with other routed packages where they are carried with the other wrapped packages and sent to the sorters for sheet writing. Any suitable means may be provided for transporting the wrapped packages to the sorters for sorting in different bins for delivery, such as a conveyor or the like. In the event that the authorization clerk finds that a "charge" package must be held up pending a further investigation of the credit account of the purchaser, the clerk places the same in the refer bins 25 beneath the authorization table 26 and conveyor 17 where they are stored and later removed and replaced in stock. In the event that the authorization is handled in the tube room of the store, the bins could be used for the storing of parcel post or express shipments.

The conveyor 17 above referred to is of normal construction and comprises a plurality of overlapping plates 30, that is, the edge of one plate overlaps the next adjacent plate to provide a continuous conveying surface and to accommodate the relative movement of the plates, at the turns in the track 31, over which the conveyor passes. The track 31 is composed of two sets of U-shaped rails or channel members 32 which co-act to provide an elongated track with turns at opposite ends.

The plates 30 are connected with the next adjacent plates by links 33, which have one of their ends pivoted to the plates by bolts 34, the said bolts being riveted to the plates and provided with rounded heads 35 which rise above the top face of the plates. Suitable washers 36 are provided on the bolt for spacing the links, while cotter pins 37 pass through the bolts for securely holding the links together. The lower ends of the bolts 34 are provided with concave recesses 38 for the reception of ball bearings 39 which travel in the U-shaped rails 32 and serve as a traction means for the conveyor. The free meeting ends of the links 33 are pivotally connected by bolts 40, which bolts are shorter than the bolts 34 and do not pass through the plates nor enter the U-shaped rails 32. Washers 41 are provided on the bolts for spacing the links and which links are prevented from disengagement with the bolts by cotter pins 42.

The underside of each plate 30 carries a rack bar 42', one end of which is concave as at 44 and the other end convex as at 45, the convex end of one rack bar co-acts with the concave end of the next adjacent rack bar to permit of the different angular positions of the plates when travelling about the curves at the ends of the track. When the plates are moved in a straight course, the rack bars are in longitudinal alignment, and engaged by oppositely driven gears 46 mounted beneath the conveyor on opposite sides thereof, and which gears are driven by respective motors 47. It will be seen that when the motors are in operation, the conveyor plates will be caused to move in the direction of the arrows shown in Figure 1 of the drawings. By connecting the links 33 in the manner shown, the outer ends of the plates may be permitted to separate from each other into a fan shape, while the inner ends of the plates are moved inward over each other until the plates reach the straightaway portions of the rails, at which time the plates automatically return to their normal position. The heads 35 of the bolts 34 serve as a bearing for the plates as the same slide one over the other, and if desired additional projections may be provided on the plates for affording additional bearing surfaces. The links 33 co-act to provide a lazy tong movement between the plates, which are operable by the curves in the rails, for moving the plates to their various angular positions.

In Figures 10 and 11, I have shown a modified form of unit 48 which is constructed in a manner similar to the preferred form, but illustrates how an original unit may be added to. In the drawing, the numeral 49 illustrates the original unit to which an additional section is connected at a right angle thereto, as shown at 50.

To accommodate the opposite turns in the track of the modified form, I provide rack bars 33' with rounded ends 44' so that the plates may freely turn in opposite directions when passing the rounded corners in the track.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a systematizing unit for preparing packages for delivery, the combination of an endless moving conveyor on which the articles to be delivered are deposited, and tables surrounding the conveyor and disposed beneath the same and at which the wrapping clerks are adapted to stand for lifting the packages from the conveyor to the tables, said conveyor defining a paddock having a floor raised above the level of the supporting surface of the unit, and means of ingress and egress to and from said paddock, receiving tables within said paddock on opposite sides of the means of ingress and egress between which a routing clerk is adapted to be positioned to mark the wrapped packages as they pass on said conveyor, the same being replaced thereon by the wrapping clerk after being wrapped, an elongated table within said paddock for the reception of authorization indexes, and bins beneath said elongated table and beneath one side of said conveyor, substantially as and for the purpose specified.

2. In a unit of the class described, a conveyor comprising a continuous track having curves therein, a plurality of overlapping plates, traction means on the underside of said plates movable over said track, and means connecting said plates to facilitate of the different angular positions of the plates when passing the curves in said track, rack bars carried on the underside of said plates and normally disposed in alignment when the plates are moving in the straight portion of said track to provide a continuous rack, each of said rack bars having one of their ends convex and their opposite end concave, whereby the convex end of one rack bar co-acts with the concave end of the next adjacent rack bar for permitting of the relative movements of said plates when passing the curves in said track, and driven gears co-acting with said rack bars for imparting movement to said plates over said track.

3. In a unit of the class described, a conveyor comprising a continuous track having curves therein, a plurality of overlapping plates, traction means on the underside of said plates movable over said track, and means connecting said plates to facilitate of the different angular positions of the plates when passing the curves in said track, said last means including links pivotally connected to each of said plates and having their meeting ends pivotally connected together, the said links co-acting to form a lazy-tong structure.

4. In a unit of the class described, a conveyor comprising a pair of parallel U-shaped rails co-acting to provide a continuous track having curves therein, a plurality of overlapping plates, links pivotally connected to the underside of said plates, the pivots of said links having concave recesses in their free ends, and spherical members seated in said recesses and disposed within said U-shaped rails for movably supporting said plates thereover, the free ends of the links of each plate being pivotally connected with the free ends of the links of the next adjacent plates.

In testimony whereof I hereby affix my signature.

ALEXANDER C. YOUNGSON.